(12) United States Patent
Gangwar

(10) Patent No.: US 9,496,569 B2
(45) Date of Patent: Nov. 15, 2016

(54) AUTOMOTIVE ROTATABLE POWER TRANSFER SYSTEM AND METHOD OF OPERATING SAME

(75) Inventor: Hans Buus Gangwar, Livonia, MI (US)

(73) Assignee: Ford Motor Company, Dearborn, MI (US)

(*) Notice: Subject to any disclaimer, the term of this patent is extended or adjusted under 35 U.S.C. 154(b) by 2639 days.

(21) Appl. No.: 12/145,961

(22) Filed: Jun. 25, 2008

(65) Prior Publication Data
US 2009/0325000 A1    Dec. 31, 2009

(51) Int. Cl.
*H05B 3/00* (2006.01)
*H01M 8/04* (2016.01)

(52) U.S. Cl.
CPC ..... *H01M 8/04253* (2013.01); *H01M 2250/20* (2013.01); *Y02E 60/50* (2013.01); *Y02T 90/32* (2013.01)

(58) Field of Classification Search
CPC .................................................. H01M 8/04253
USPC .......... 219/200–208, 463.1, 464.1, 469–471, 219/534, 535, 543–547; 429/413, 414, 32, 429/39, 12, 34, 38
See application file for complete search history.

(56) References Cited

U.S. PATENT DOCUMENTS

| | | | |
|---|---|---|---|
| 2,639,134 A * | 5/1953 | Winslow et al. | ............... 73/530 |
| 4,091,264 A | 5/1978 | Sarcia | |
| 4,200,784 A | 4/1980 | Albaric et al. | |
| 4,329,566 A | 5/1982 | Hooper | |
| 5,890,033 A | 3/1999 | Parker | |
| 6,040,562 A | 3/2000 | Tokumoto et al. | |
| 6,332,305 B1 | 12/2001 | Takahashi | |
| 6,679,085 B1 | 1/2004 | Singer et al. | |
| 6,720,102 B2 | 4/2004 | Edwards | |
| 2006/0093883 A1 | 5/2006 | Pristash | |
| 2006/0099477 A1 | 5/2006 | Hoffjann et al. | |
| 2006/0154132 A1 | 7/2006 | Misawa | |

* cited by examiner

*Primary Examiner* — Phuong Nguyen
(74) *Attorney, Agent, or Firm* — Damian Porcari; Brooks Kushman P.C.

(57) ABSTRACT

A rotating power transfer system for an automotive fuel cell vehicle includes one of an impeller and turbine in fluid communication with a fuel cell stack, an electric machine and a shaft operatively associated with the one of impeller and turbine. The system also includes a heating element disposed within the shaft. The heating element is configured to be selectively electrically coupled with a stator coil of the electric machine.

17 Claims, 4 Drawing Sheets

AUTOMOTIVE ROTATABLE POWER TRANSFER SYSTEM AND METHOD OF OPERATING SAME

BACKGROUND

1. Field

Embodiments of the invention relate to automotive rotatable power transfer systems and methods of operating the same.

2. Discussion

Certain techniques are known for heating rotating mechanical elements. U.S. Pat. No. 4,200,784 to Albaric et al. is one such example. Albaric et al. discloses a hollow, rotatable shaft bore heater assembly for heating a shaft. Rotatable shaft heating is provided by a plurality of electrical heaters situated in slots formed on inner surfaces of a plurality of foundation members which are insertable in the hollow shaft and are biased thereagainst by biasing structure. The biasing structure provides biasing force between circumferentially adjacent foundation members so as to maintain contact between the shaft and foundation members during non-rotation of the shaft.

U.S. Pat. No. 4,329,566 to Hooper is another example. Hooper discloses a heated fuser roll for use in a fuser apparatus for fixing toner images to a support surface. The fuser roll includes a circular sleeve member having at least one heating unit positioned within the sleeve member. Each heating unit includes (i) a plurality of axially disposed thermally conductive members, (ii) a plurality of wafer shaped heating elements and (iii) resilient means. Each of the heating units is separated from each other by an insulating member. A plurality of cavities on flat surfaces of the thermally conductive members is provided. One of the heating elements is positioned within each of the cavities.

SUMMARY

A rotating power transfer system for an automotive fuel cell vehicle including a fuel cell stack includes one of an impeller and turbine in fluid communication with the fuel cell stack, an electric machine including a stator coil and a shaft operatively associated with the one of impeller and turbine. The system also includes a heating element disposed within the shaft and configured to be selectively electrically coupled with the stator coil.

A rotating power transfer system including a stator coil for an automotive vehicle includes one of an impeller and turbine and a rotatable member mechanically coupled with the one of impeller and turbine. The rotatable member includes a heating element to heat the rotatable member. The system also includes a mechanical governor assembly configured to selectively electrically couple the heating element and the stator coil based on a rotational speed of the rotatable member.

A method of heating a shaft, including a heating element, of an automotive rotating power transfer device including a stator coil includes electrically coupling the stator coil and heating element if a rotational speed of the shaft is less than a threshold rotational speed and electrically de-coupling the stator coil and heating element if the rotational speed of the shaft is equal to or greater than the threshold rotational speed.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
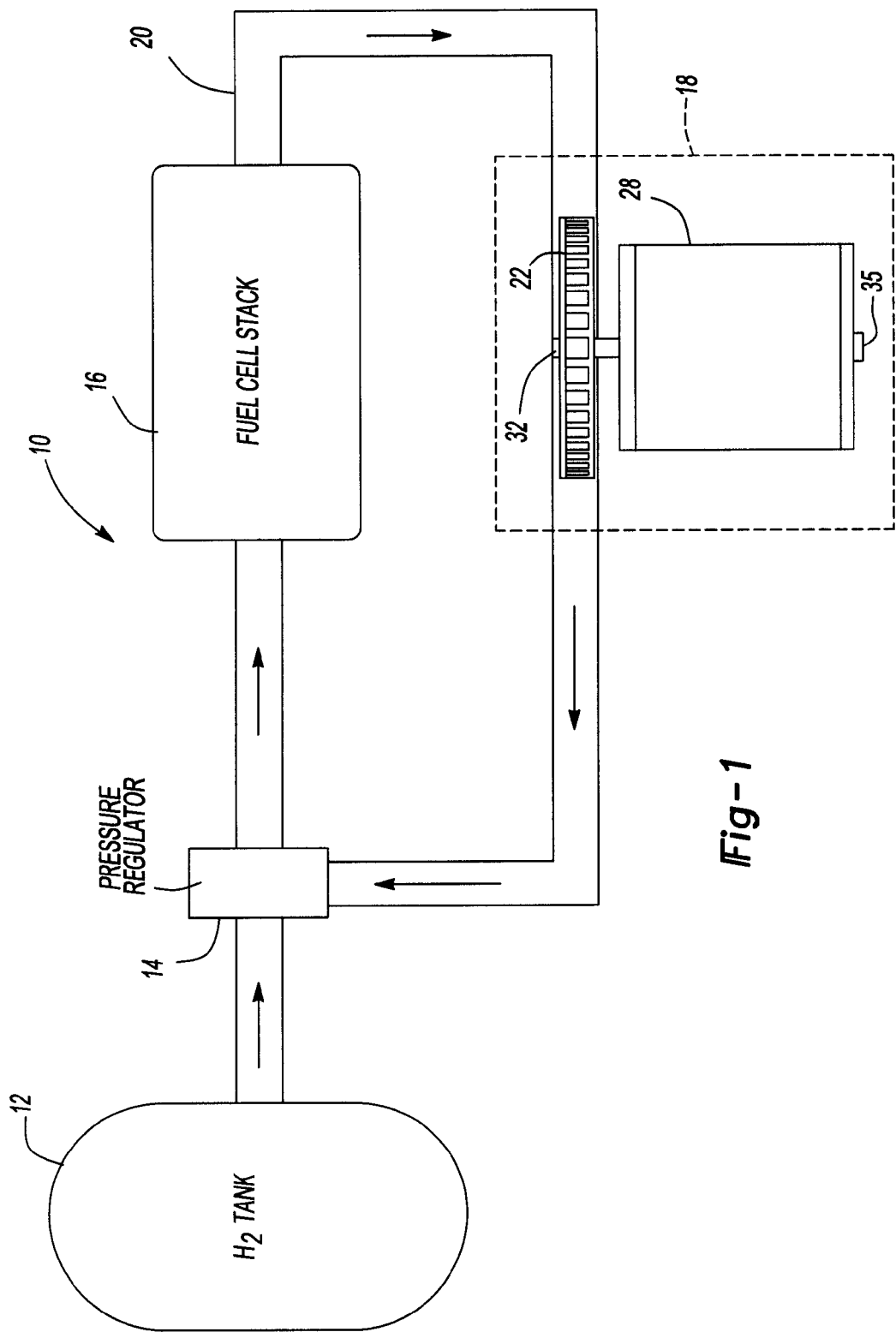
FIG. 1 is a schematic view of an embodiment of a fuel cell system for an automotive vehicle.

Referring now to FIG. 1, an embodiment of an automotive fuel cell system 10 includes a hydrogen tank 12, pressure regulator 14, fuel cell stack 16 and motor driven pump 18. Other embodiments, of course, may have different arrangements and/or configurations and be implemented in different environments, e.g., a stationary fuel cell for home power generation, etc.

Hydrogen gas (indicated by arrow) flows from the hydrogen tank 12, through the pressure regulator 14 and to the fuel cell stack 16. The hydrogen gas reacts with oxygen (not shown) within the fuel cell stack 16 to produce electrical power. This reaction also produces water vapor. In certain proton exchange membrane (PEM) technologies, nitrogen gas crosses over from a cathode to an anode through the PEM. This dilutes the concentration of hydrogen in the anode. In order to maintain a proper concentration of hydrogen, the gas mixture exits the fuel stack 16 and is re-circulated via a recirculation loop 20 powered by a radial-flow impeller 22 of the motor driven pump 18. In other embodiments, the impeller 22 may act as a turbine, for example, if the flow of fluid causes the impeller 22 to rotate, thus generating electrical power.

Water vapor may also exit the fuel cell stack 16 and enter the recirculation loop 20. In some embodiments, a water separator (not shown) and purge valve (not shown) may be provided in the recirculation loop 20 to facilitate the removal of some of the water vapor. If the fuel cell system 10 is deactivated in cold environments, water vapor may condense and freeze in the motor driven pump 18 preventing the impeller 22 from moving. In certain prior art systems, a heater (not shown) separate from the motor driven pump 18 is used to melt ice that may have formed in the motor driven pump 18.

Figure 2:
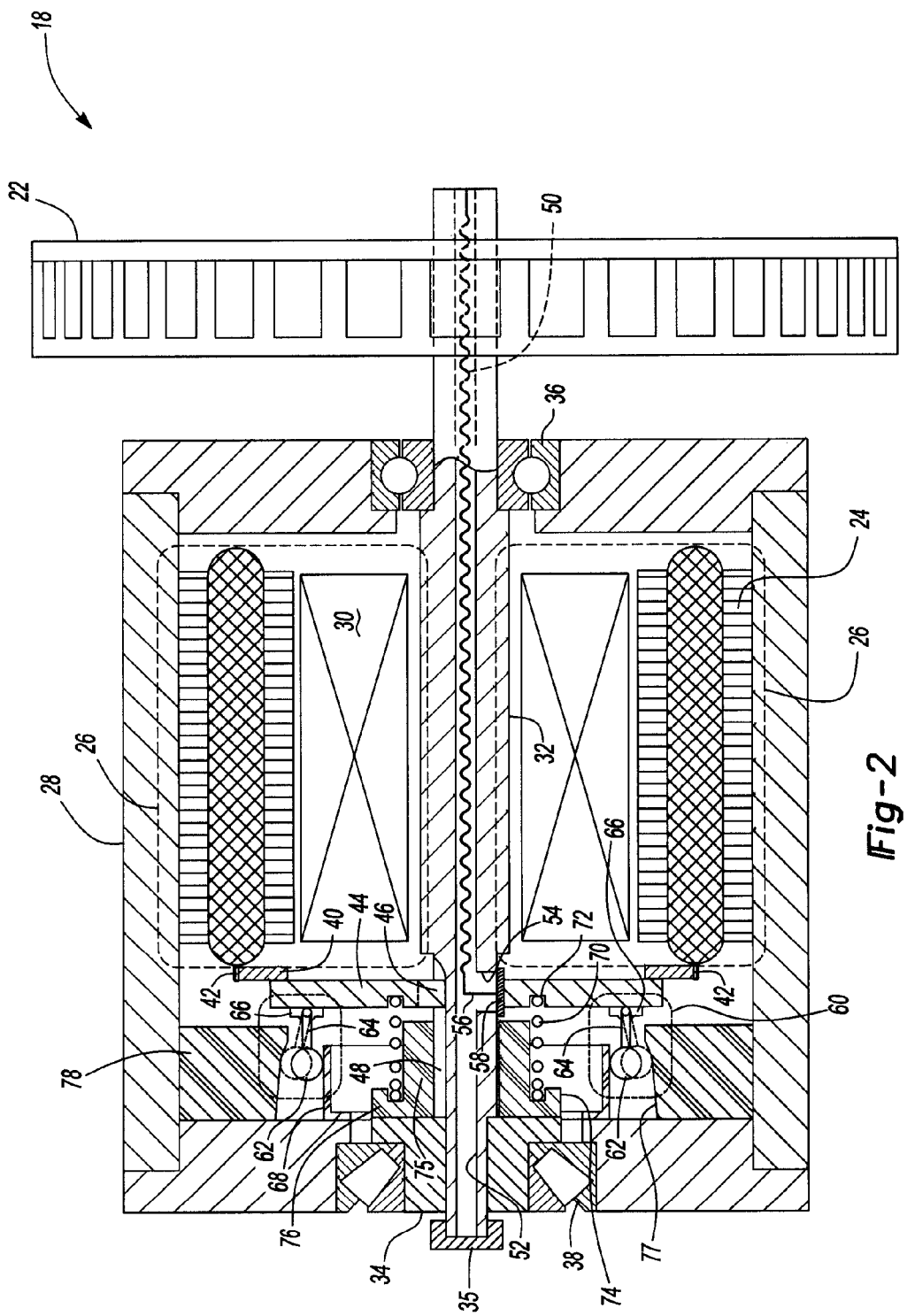
FIG. 2 is a schematic view, in cross-section, of a motor driven pump.

Referring now to FIG. 2, electrical power is provided to stator coils 24 of an electric machine 26 to produce an electromagnetic field. The stator coils 24 are fixedly attached with a housing 28 of the motor driven pump 18. This electromagnetic field causes a rotor 30 to rotate relative to the stator coils 24. A hollow shaft 32 is fixedly attached with the rotor 30. The impeller 22 is fixedly attached, e.g. press fit, with the shaft 32. In the embodiment of FIG. 2, a collar 34 and cap 35 are fixedly attached, e.g. press fit, onto an end of the shaft 32 opposite the impeller 22. While rotating, the shaft 32 and collar 34 are rotatably supported on bearings 36, 38 mounted within the housing 28.

An electrically conductive ring 40 may be electrically connected with the stator coils 24 such that electrical current provided to the stator coils 24 may pass through the ring 40. In the embodiment of FIG. 2, electrical leads 42 electrically connect the stator coils 24 and the ring 40. Any suitable electrical connection, however, may be used.

An electrically conductive plate 44 may be drivingly engaged with and axially free in the shaft 32 via a key 46 provided on the plate 44 and a key way 48 provided on the shaft 32. The plate 44 may thus move axially relative to the shaft 32. In other embodiments, the key 46 may be provided on the shaft 32 and the keyway 48 may be provided on the plate 44. Multiple keys 46 and keyways 48 circumferentially spaced apart may be also provided. Other configurations and arrangement are, of course, also possible.

A heating element 50 is disposed within a passageway 52 of the shaft 32. The heating element 50, when activated, heats the shaft 32 to, for example, melt any ice formed on an exterior of the shaft 50. In addition, heat is conducted into the impeller 22 (e.g. aluminum material), which may also melt any ice dams between the impeller profile and surrounding housing.

The shaft 32 includes an aperture 54 adjacent to the plate 44 though which an end 56 of the heating element 50 passes. The end 56 terminates in an electrical contact 58, e.g., electrically conductive foil, that is at least partially carried by the exterior of the shaft 50. The electrical contact 58 and plate 44 may be positioned in contact with one another such that electrical current may pass from the plate 44 to the electrical contact 58.

Figure 3:
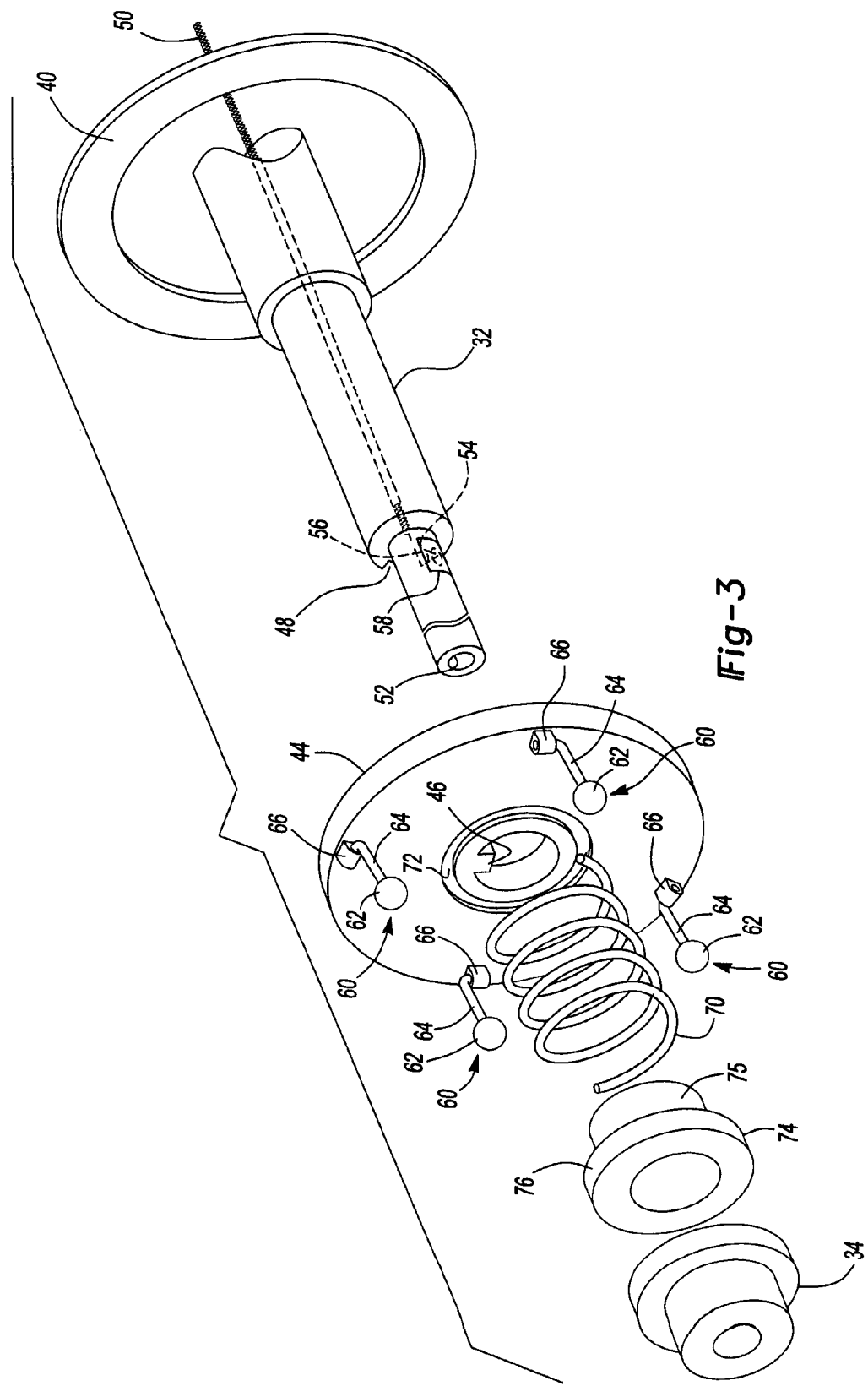
FIG. 3 is an exploded assembly view of a portion of the motor driven pump of FIG. 2.

Referring now to FIGS. 2 and 3, four governors 60 are spaced at approximately 90° intervals around the plate 44. In other embodiments, however, any suitable number of governors 60 may be used. For example, three governors may be spaced at approximately 120° intervals around the plate 44. Because the plate 44 rotates, it may be desirable to approximately equally space the governors 60 around the plate 44 to minimize vibration. The governors 60, however, may be spaced as desired.

As explained below, the governors 60 may move the plate 44 relative to the shaft 32 based on the rotational speed of the shaft 32 to selectively electrically connect the stator coils 24 and heating element 50. In other embodiments, however, a switch electrically connected with the stator coils 24 and heating element 50 may be used instead of the plate 44/governor 60 configuration described above. For example, a controller and sensor (not shown) may monitor the rotational speed of the shaft 32 and command the switch closed if the rotational speed is less than a threshold rotational speed. The controller and sensor may command the switch open if the rotational speed is greater than or equal to the threshold rotational speed. Other configurations and arrangements are, of course, also possible.

The governors 60 of FIGS. 2 and 3 each include a weight 62 on an end of a governor shaft 64, as apparent to those of ordinary skill. The governor shafts 64 are each mounted within (and may move relative to) a governor housing 66 mechanically attached with the plate 44. Springs (not shown) within each of the governor housings 66 spring bias one of the governor shafts 64 toward a stop collar 68 fixedly attached with the housing 28. That is, if the plate 44 is not moving, the weights 62 will rest against the collar 68 (as shown in solid line in FIG. 2.) As explained in more detail below, the weights 62 move away from the collar 68 if the plate 44 achieves a threshold rotational speed (as shown in phantom line in FIG. 2.)

An end of a coil spring 70 is seated within a recess 72 formed on a side of the plate 44 adjacent to the governors 60. Another end of the spring 70 is seated within a spring collar 74 fixedly attached, e.g., bolted, bonded, etc., with the collar 34. The collar 74 of FIG. 2 includes a guide portion 75 surrounded by the spring 70 and a seat portion 76 that retains the another end of the spring 70.

In the embodiment of FIG. 2, the spring 70 biases the plate 44 towards the ring 40. The spring 70 has a tendency to resist compression. In other embodiments, the spring 70 may be located between the electric machine 26 and the plate 44 (and thus have a tendency to resist extension.) In some of these other embodiments, the collar 74 may be fixedly attached with the rotor 30 and the spring 70 seated therein accordingly. Alternatively, the spring 70 may be seated against the shaft 32. Other arrangements are also possible.

A ramping surface 77 on which the weights 62 may travel is provided by a ramping element 78. In the embodiment of FIG. 2, the ramping element 78 comprises a plate fixedly attached, e.g., bolted, with the housing 28. The ramping surface 77 is formed by a chamfered aperture in the plate 78. In other embodiments, the ramping element 78 may take any suitable shape and/or configuration.

As explained above, water vapor may condense and freeze around the shaft 32 thus preventing its movement if, for example, the system 10 illustrated in FIG. 1 is deactivated in freezing conditions. If reactivated, electrical current provided to the stator coils 24 will pass through the electrical leads 42, the ring 40, the plate 44 and the electrical contact 56 to energize the heating element 50 (even though the shaft 32 is frozen in place). The heating element 50 will melt any ice around the shaft 32 to free its movement. As the shaft 32 begins to rotate, the plate 44 keyed to the shaft 32 will also rotate. As the plate 44 rotates, the weights 62 will begin to move away from the collar 68 and, once the plate 44 achieves a threshold rotational speed, make contact with the ramping surface 77.

The threshold rotational speed may be dictated by, for example, the number of governors 60, the mass of the weights 62, the length of the governor shafts 64, etc., as apparent to those of ordinary skill from the appropriate equations of motion. In the embodiment of FIG. 2, the threshold rotational speed is approximately 5% of a maximum rotational speed of the shaft 32. The threshold rotational speed for other embodiments may be different and driven by design and/or packaging considerations.

Figure 4:
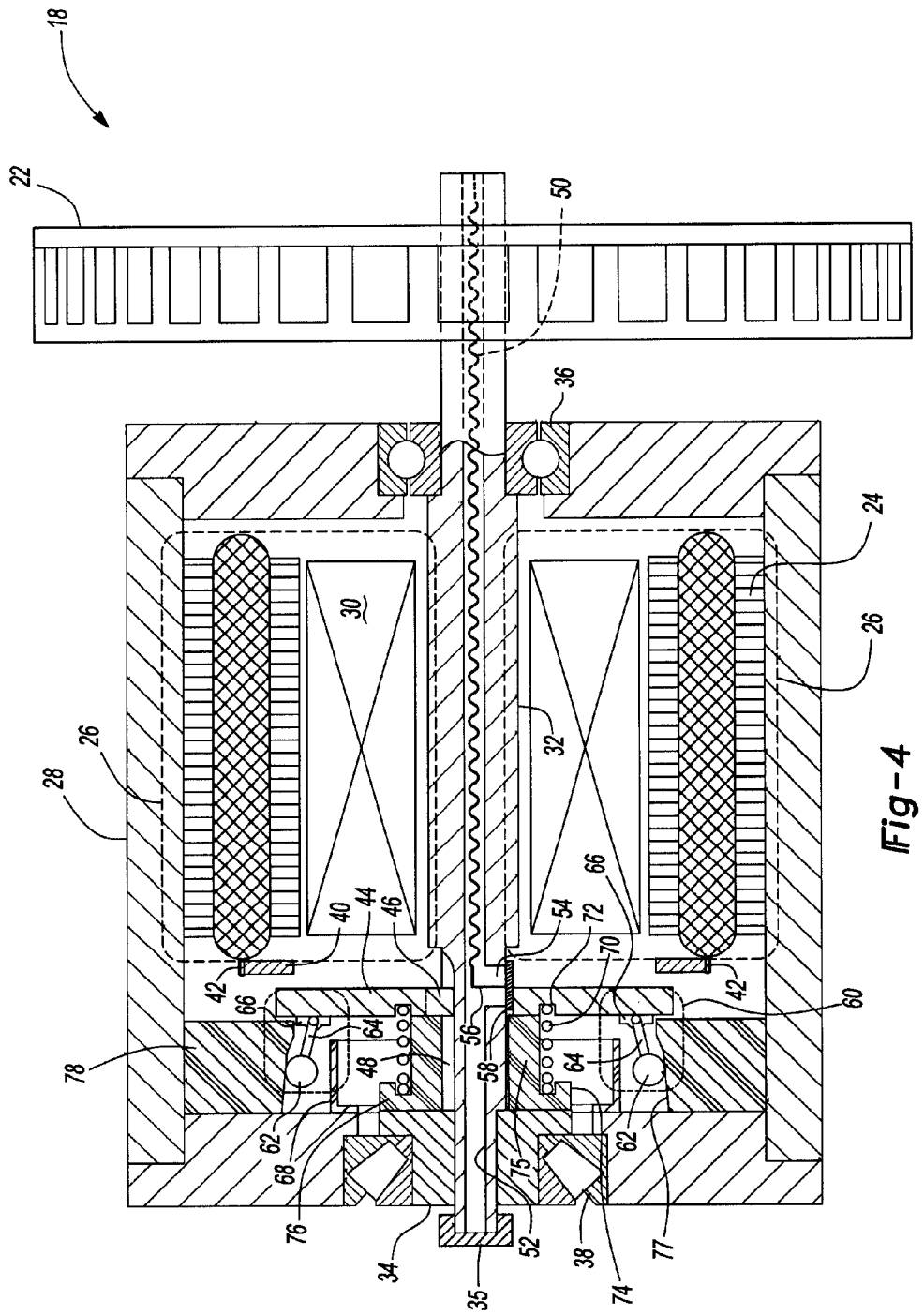
FIG. 4 is another schematic view, in cross-section, of the motor driven pump of FIG. 2.

Referring now to FIG. 4, as the plate 44 continues to increase in rotational speed, forces generated by the rotating weights 62 will permit the weights 62 to "climb" the ramping surface 77 (thus overcoming the biasing force of the spring 70) and move the plate 44 away from the ring 40. The electrical connection between the stator coils 24 and the heating element 50 will be broken once the plate 44 no longer contacts the ring 40. The plate 44 may continue to travel away from the ring 40 until it makes contact with the ramping element 78. In other embodiments, a stiffness of the spring 70, or other suitable mechanism/element, may be used to limit the travel of the plate 44.

The plate 44 will return to the position illustrated in FIG. 2 if, for example, the turbo machine 18 is deactivated or the rotational speed of the shaft 32 is less than the threshold rotational speed.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A rotating power transfer system for an automotive fuel cell vehicle including a fuel cell stack, the system comprising:

one of an impeller and turbine in fluid communication with the fuel cell stack;
an electric machine including a stator coil;
a shaft operatively associated with the one of impeller and turbine; and
a heating element disposed within the shaft and configured to be selectively electrically coupled with the stator coil.

2. The system of claim 1 wherein the heating element is electrically coupled with the stator coil if the shaft is rotating below a threshold speed.

3. The system of claim 1 wherein the heating element is electrically de-coupled from the stator coil if the shaft is rotating at or above a threshold speed.

4. The system of claim 1 further comprising a mechanical governor assembly operatively associated with the shaft and configured to electrically de-couple the heating element from the stator coil if the shaft is rotating at or above a threshold speed.

5. The system of claim 4 wherein the mechanical governor assembly includes an electrically conductive member and wherein the heating element and stator coil are selectively electrically coupled via the electrically conductive member.

6. The system of claim 5 wherein the mechanical governor assembly is further configured to axially move relative to the shaft if the shaft is rotating at or above the threshold speed.

7. The system of claim 6 further comprising a spring configured to resist the axial movement of the mechanical governor assembly.

8. The system of claim 5 wherein the electrically conductive member comprises an electrically conductive plate.

9. The system of claim 5 wherein the shaft includes a groove and the electrically conductive member includes a tongue and wherein the tongue moves within the groove if the electrically conductive member moves relative to the shaft.

10. The system of claim 1 wherein the one of impeller and turbine is a radial-flow device.

11. A rotating power transfer system including a stator coil for an automotive vehicle comprising:
one of an impeller and turbine;
a rotatable member mechanically coupled with the one of impeller and turbine and including a heating element to heat the rotatable member; and
a mechanical governor assembly configured to selectively electrically couple the heating element and the stator coil based on a rotational speed of the rotatable member.

12. The system of claim 11 wherein the mechanical governor assembly includes a conducting member having an electrically conductive portion and wherein the mechanical governor assembly selectively electrically connects the heating element and the stator coil via the electrically conductive portion.

13. The system of claim 12 wherein the mechanical governor assembly is further configured to move relative to the rotatable member if the rotatable member has a rotational speed equal to or greater than a threshold rotational speed.

14. The system of claim 12 wherein one of the rotatable member and conducting member includes a key and the other of the rotatable member and conducting member includes a key-way and wherein the key moves within the key-way if the conducting member moves relative to the rotatable member.

15. The system of claim 11 wherein the heating element and stator coil are electrically coupled if the rotatable member has a rotational speed less than a threshold rotational speed.

16. The system of claim 11 wherein the heating element and stator coil are electrically de-coupled if the rotatable member has a rotational speed equal to or greater than a threshold rotational speed.

17. The system of claim 11 wherein the rotatable member comprises a hollow shaft.

* * * * *